J. R. FLANNERY, B. E. D. STAFFORD & E. I. DODDS.
STAY BOLT STRUCTURE FOR BOILERS.
APPLICATION FILED FEB. 29, 1916.
1,203,516.                                           Patented Oct. 31, 1916.
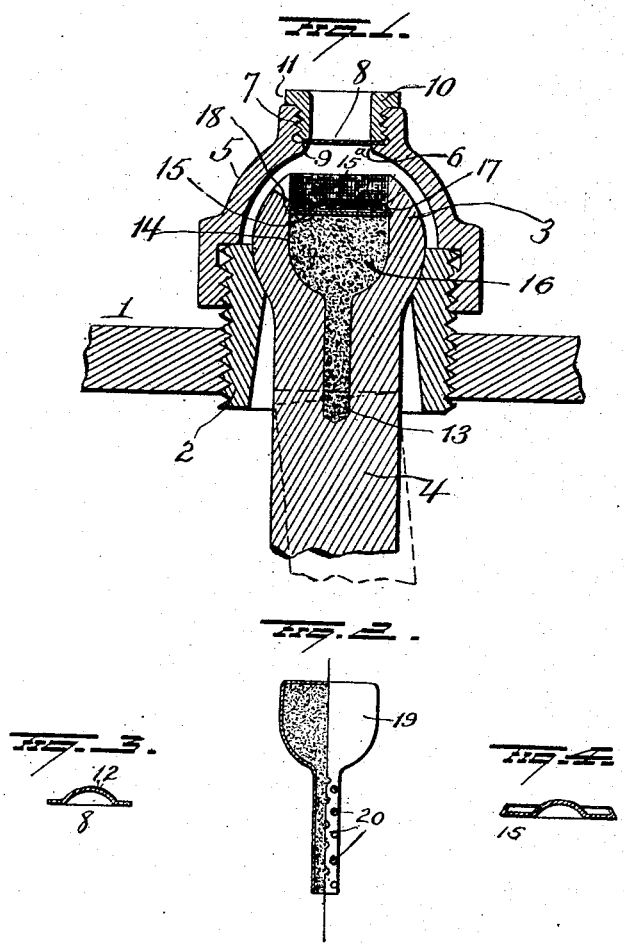

UNITED STATES PATENT OFFICE.

JOHN ROGERS FLANNERY, BENJAMIN E. D. STAFFORD, AND ETHAN I. DODDS, OF PITTSBURGH, PENNSYLVANIA, ASSIGNORS TO FLANNERY BOLT COMPANY, OF PITTSBURGH, PENNSYLVANIA.

STAY-BOLT STRUCTURE FOR BOILERS.

1,203,516.    Specification of Letters Patent.    Patented Oct. 31, 1916.

Application filed February 29, 1916. Serial No. 81,261.

*To all whom it may concern:*

Be it known that we, JOHN ROGERS FLANNERY, BENJAMIN E. D. STAFFORD, and ETHAN I. DODDS, citizens of the United States, and residents of Pittsburgh, in the county of Allegheny and State of Pennsylvania, have invented certain new and useful Improvements in Stay-Bolt Structures for Boilers; and we do hereby declare the following to be a full, clear, and exact description of the invention, such as will enable others skilled in the art to which it appertains to make and use the same.

This invention relates to improvements in stay bolt structures for boilers,—the object of the invention being to provide simple and efficient means for cleaning out a normally closed tell-tale hole in the stay bolt and to insure an opening in the cap in the event the stay bolt should become fractured or broken, thus permitting the escape of steam or water through said tell-tale hole and through an opening in the cap to indicate the damaged condition of the bolt.

With these and other objects in view, the invention consists in certain novel features of construction and combinations of parts as hereinafter set forth and pointed out in the claims.

In the accompanying drawings, Figure 1 is a sectional view illustrating an embodiment of our invention, and Fig. 2 is a detail view of the cartridge, and Figs. 3 and 4 are views of modified forms of sealing disks.

1 represents an outer boiler sheet having a threaded hole for the accommodation of a threaded sleeve 2, the latter having a curved bearing therein for the rounded or spherical head 3 of a stay bolt 4. A cap 5 is screwed upon the outer end of the sleeve 2 and is of such size as to be spaced somewhat from the bolt head 3. This cap is made with a central opening 6 in axial alinement with the stay bolt, and surrounding this opening is an internally threaded boss 7. A destructible disk 8 is disposed upon a shoulder 9 formed at the base of and within the boss 7 so as to close the opening 6 of the cap and this disk is held in place by means of a tubular plug or sleeve 10 screwed into the boss 7 and having a flange 11 which overhangs the free end of the boss. Instead of making the disk 8 flat as shown in Fig. 1, it may be formed with a central outwardly bulged portion 12, as shown in Fig. 3.

The stay bolt 4 is made with an axial cavity or opening forming with a tell-tale duct 13 which may extend partly through the center of the bolt and the outer portion of this duct in the head 3 of the bolt may be enlarged to form a cup-shaped portion 14 extending to the end of the head where it is open. The opening 13—14 which constitutes the tell-tale duct opening in the bolt, contains a material which will, when subjected to the action of water cause such reactions as will result in the generation of gas and heat and break-down such metals as Babbitt metal or aluminum. For example, caustic alkali might be employed. The disk 8 is made of metal of this character, as is also a disk 15 which incloses the material 16 within the tell-tale cavity or hole 13—14 in the bolt and normally protects the same against moisture which might enter between the bolt head and the cap. The disk 15 may be formed with a peripheral flange 17 and the wall of the portion 14 of the tell-tale opening may be made with a groove 18 to receive and form a seat for the flanged periphery of the disk. In the space above the disk 15 lubricant packing 15ª such as fish oil, graphite or cotton lint may be placed and serve to assist in normally excluding moisture from material in the tell-tale opening.

The disk 15 may be made flat as shown in Fig. 1 or it may be made with an outward bulge as shown in Fig. 4.

While the material or chemical compound may be placed into the unlined tell-tale opening, as shown in Fig. 1, still we may prefer to inclose said material within a shell 19 of such metal as Babbitt metal or aluminum, and to make the cartridge thus formed of such shape as to conform to the contour of the tell-tale opening 13—14 in the bolt, into which said cartridge is placed. The cartridge 19 may be open at the inner end of its smaller portion and said smaller portion may be provided with perforations 20.

The closing of the tell-tale opening in the stay-bolt, serves to prevent the entrance of dust, etc., to said opening and thus avoids clogging of the latter. Should the bolt become cracked, ruptured or broken, as indicated by dotted lines in Fig. 1, the entrance of water and its contact with the material contained in the tell-tale opening in the cartridge therein, will cause chemical reactions to be set up in said material which will generate heat and so act upon the metal of the disk or closure 15, as to cause the breaking-down or disintegration of the latter, thus destroying its function as a closure and permitting the escape of the chemicals to reach the disk 8 in the cap. The chemical reactions of the said material behind the cap 8 will be augmented by moisture in the space between the bolt head and the cap and the disk 8 in the cap will be promptly broken-down, dissolved or disintegrated, thus affording a free opening through the tubular plug or sleeve 10. Boiler pressure will now operate to clean out the tell-tale opening and permit the exit of water therethrough and through the tubular plug in the cap to indicate the ruptured or disabled condition of the bolt.

Various slight changes might be made in the details of our invention without departing from the spirit thereof or limiting its scope, and hence we do not wish to restrict ourselves to the precise details herein set forth, except as defined by the scope of the appended claims.

Having fully described our invention what we claim as new and desire to secure by Letters-Patent, is:—

1. A stay bolt for boilers having a tell-tale opening, a metal closure for said opening, and a cartridge adaptable to said tell-tale opening and containing a material which will, when exposed to moisture, cause reactions to be set up resulting in the disintegration, dissolving or melting of said metal closure.

2. In a stay bolt structure, a stay bolt having a tell-tale opening, a bearing for the head of the bolt, and a cap over the head of the bolt, said cap having an opening in line with the axis of the bolt, a metal closure for the opening in the cap, a metal closure for the tell-tale opening in the bolt, and material contained in said tell-tale opening, which will when exposed to moisture, cause reactions to be set up which will break down said metal closures successively.

3. In a stay bolt structure, a stay bolt having a tell-tale opening, a bearing for the head of the bolt, a cap over the head of the bolt, said cap having an opening in axial alinement with the bolt, a threaded annular boss encircling the opening in the cap, a metal closure for the opening through the cap and boss, a tubular plug entering said annular boss and engaging said closure, and material within said tell-tale opening which will, when exposed to moisture, cause reactions to be set up which will break-down said metal closure.

In testimony whereof, we have signed this specification in the presence of two subscribing witnesses.

JOHN ROGERS FLANNERY.
BENJAMIN E. D. STAFFORD.
ETHAN I. DODDS.

Witnesses:
F. H. ALLISON,
EDWIN S. RYCE.

Copies of this patent may be obtained for five cents each, by addressing the "Commissioner of Patents, Washington, D. C."